United States Patent [19]

Warner et al.

[11] Patent Number: 4,789,192
[45] Date of Patent: Dec. 6, 1988

[54] TWO-STAGE VARIABLE ORIFICE ENERGY ABSORBER WITH CYLINDER CAP HAVING RADIALLY FIXED BLOW OUT ORIFICE

[75] Inventors: Harold J. Warner, Kettering; Abayomi O. Folarin, Dayton, both of Ohio

[73] Assignee: General Motors Corporation, Detroit, Mich.

[21] Appl. No.: 52,703

[22] Filed: May 20, 1987

Related U.S. Application Data

[63] Continuation-in-part of Ser. No. 811,444, Dec. 20, 1985, abandoned.

[51] Int. Cl.[4] .............................................. B60R 19/32
[52] U.S. Cl. .................................. 293/134; 293/102; 267/116; 188/376
[58] Field of Search .............. 293/102, 132, 133, 134; 267/116, 139; 188/371, 376, 289

[56] References Cited

U.S. PATENT DOCUMENTS

| 2,440,353 | 4/1948 | Wallage | 188/289 X |
|---|---|---|---|
| 3,362,742 | 1/1968 | Sanderson | 293/134 |
| 3,700,273 | 10/1972 | Jackson et al. | 293/134 |
| 3,774,895 | 11/1973 | Willich et al. | 293/134 X |
| 3,820,772 | 6/1974 | Kerr et al. | 267/116 |
| 3,887,224 | 6/1975 | Browne | 293/134 |
| 3,968,862 | 7/1976 | Gorges et al. | 293/133 X |
| 4,003,454 | 1/1977 | Wossner | 188/322 |
| 4,054,311 | 10/1977 | Gute | 293/134 |
| 4,097,080 | 6/1978 | Petry | 293/134 |
| 4,426,109 | 1/1984 | Fike, Jr. | 293/133 |

FOREIGN PATENT DOCUMENTS

| 0074705 | 3/1983 | European Pat. Off. | 293/134 |
| 2556295 | 6/1985 | France | 293/134 |

Primary Examiner—Robert B. Reeves
Assistant Examiner—Russell D. Stormer
Attorney, Agent, or Firm—Charles R. White

[57] ABSTRACT

Energy absorbing unit for vehicle bumper support having inner and outer telescoping cylinders with a radially fixed flow control orifice in the piston cap for recessing a cooperating metering pin concentric with the orifice for controlling the flow of fluid between a pair of contractible and expansible fluid chambers to dissipate impact energy in a first stage operation. The radially fixed flow control orifice is designed to break away from the piston cap in response to predetermined high pressure buildup in one of the chambers to increase the opening between the chambers in a second stage operation to thereby reduce pressure and absorb the energy of increased impact load. A gas spring in the unit moves the two cylinders to their extended position on removal of bumper impact load.

3 Claims, 2 Drawing Sheets

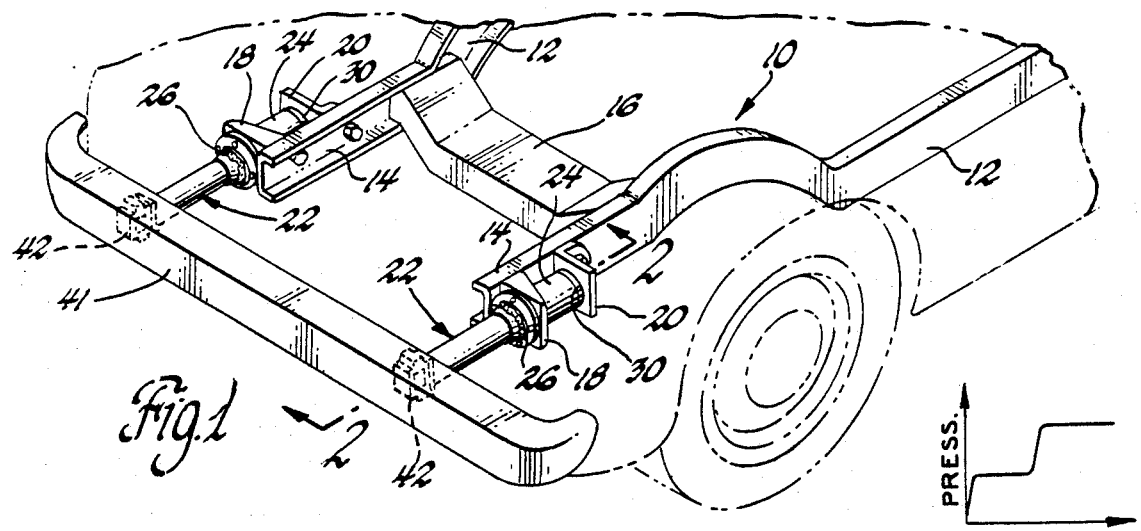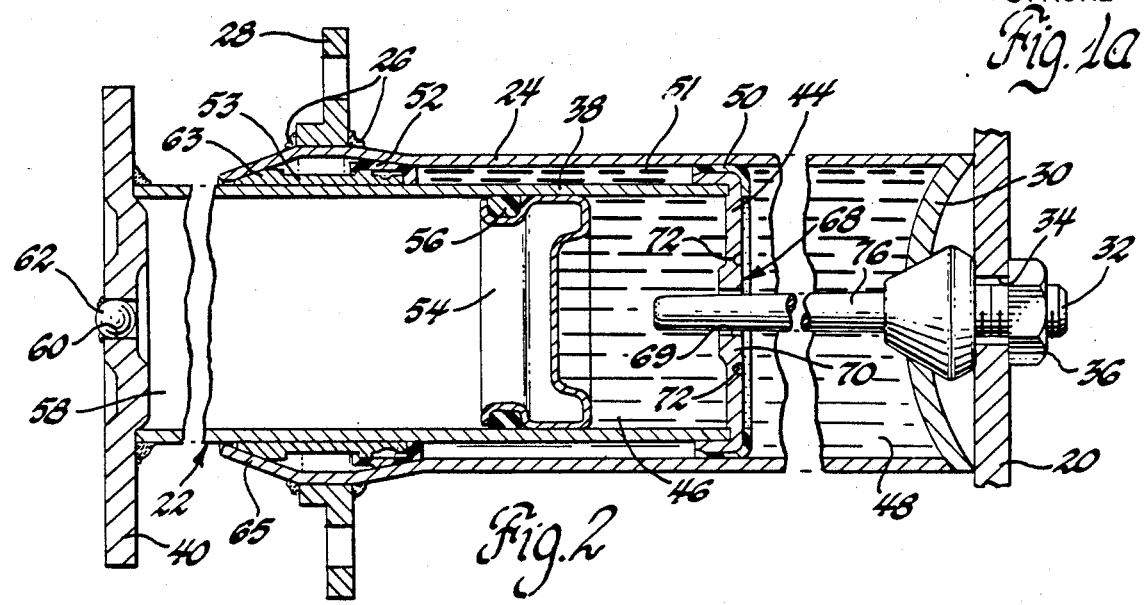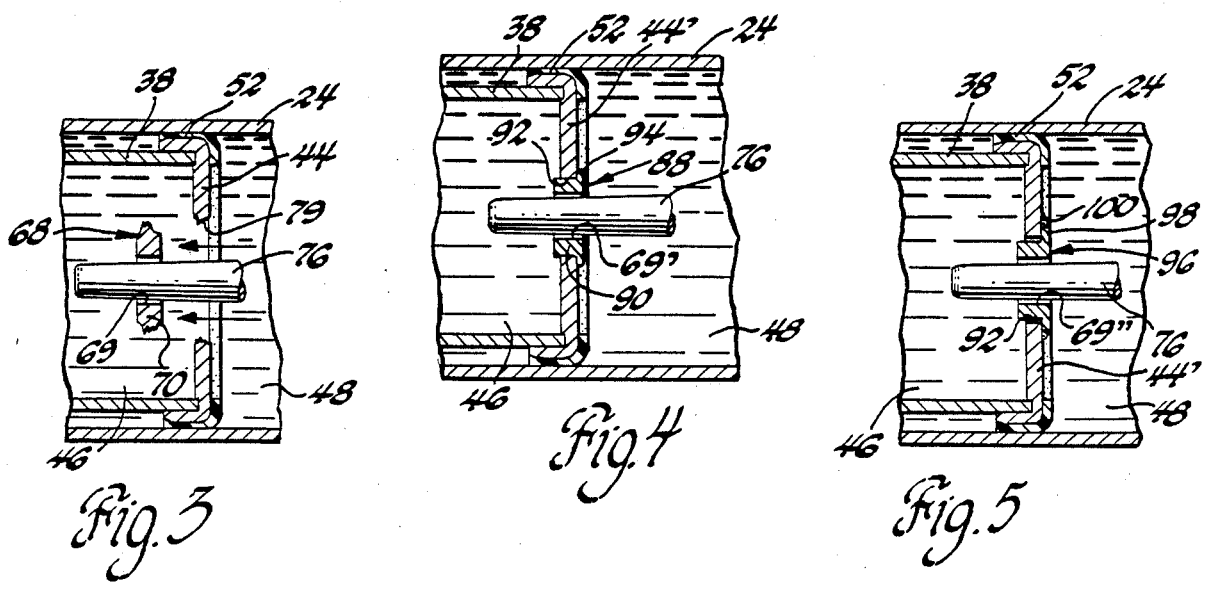

TWO-STAGE VARIABLE ORIFICE ENERGY ABSORBER WITH CYLINDER CAP HAVING RADIALLY FIXED BLOW OUT ORIFICE

This application is a continuation-in-part of U.S. Ser. No. 811,444, filed Dec. 20, 1985, now abandoned.

This invention relates to energy absorbers for absorbing impact loads imparted to vehicle bumpers and more particularly to a variable orifice energy absorbing unit having a cylinder cap with a radially fixed flow control orifice receiving a stroking tapered metering pin metering fluid flow between hydraulic chambers of the unit which is designed to break away in response to predetermined high pressure buildup leaving a larger diameter orifice with optimized concentricity with respect to the metering pin for absorption of energy of increased load.

Prior to the present invention both constant and variable orifice hydraulic energy absorber units have been used to mount bumper assemblies to a vehicle frame or other support structure. Variable orifice units are generally preferred since they spread the energy absorption more evenly over the entire stroke of the unit producing a "square wave" energy absorption curve. Some variable orifice units have telescoping cylinders providing a pair of contractible and expandable fluid chambers hydraulically interconnected by a flanged floating orifice element in the fixed end cap of a cylinder tube whose orifice area is contained by a tapered metering pin that gradually restricts the flow fluid therebetween when the unit is being collapsed by impact forces to absorb impact energy. The orifice element radially adjusts relative to the cap during such stroke to compensate for misalignment between the metering pin and the orifice. Spring devices are used to return the cylinders to an extended position after removal of the impact load. In some prior variable orifice arrangement, the floating orifice blows away at varying higher impact loads to increase orifice size so that the energy absorber is effective in absorbing a higher level of impact energy while the integrity of the unit is maintained. Such units while effective often do not meet higher standards required for blow out at a predetermined higher impact load because the flanged orifices have been radially moved by the pin and their blow out pressures accordingly vary with radial position. This radial movement causes uneven distribution of blow out forces and there is inconsistency between unit operation of the same design. One unit may blow out at a 10 mph impact while a second unit of the same design would blow out at a 15 mph impact.

In a prior constant orifice energy absorbing unit a blow out area is provided around an orifice portion in a piston to increase orifice area size during high impact loads to provide a two-stage unit. However, this unit does not use a tapered metering pin and does not provide the efficient square wave energy absorption curve as in variable orifice designs.

It is a feature, object and advantage of this invention to provide a new and improved variable orifice energy absorber having telescoping inner and outer cylinders providing a pair of expansible and contractible chambers interconnected by a radially orifice radially fixed in an end cap of the cylinder which is gradually restricted by a tapered pin extending therethrough to meter fluid between the chambers when the unit is collapsed on impact of a bumper supported thereby to provide for energy absorption in a first stage of operation; the end wall provides frangible support for the orifice which releases at a constant pressure during high speed impact to provide for absorption of energy in a second stage of operation.

Another feature, object and advantage of this invention is to provide a new and improved telescoping metering pin variable orifice energy absorber unit having radially fixed orifice means in a cylinder cap with optimized concentricity with the pin and hydraulically interconnecting a pair of variable volume chambers filled with oil and operative in response to buildup of a predetermined pressure in the unit to control oil flow between the chambers to dissipate impact energy and to further break away at a predetermined higher pressure from a support to provide a second and larger diameter radially fixed orifice means for a second level of energy absorption by increasing oil flow between the chambers via the second orifice means in a second stage of operation thereby providing constant and stepped square wave energy absorption performance.

It is a feature, object and advantage of this invention is to provide a new and improved metering pin variable orifice energy absorber having telescoping cylinders providing a pair of variable volume hydraulic fluid chambers hydraulically interconnected by a orifice rigidly secured within an opening in a cylinder cap which cooperates with the metering pin concentric with the orifice to meter fluid flow around the pin between the chambers to dissipate impact energy and having frangible flange connection for high pressure break away to effect a large second orifice interconnecting between the chambers to meter an increased flow of fluid completely around the pin and absorb a higher level of energy in a second stage of operation.

It is a feature, object and advantage of this invention to provide a new and improved variable orifice energy absorber having telescoping inner and outer cylinders providing a pair of expansible and contractible chambers interconnected by a radially fixed orifice provided in an end cap radially adjustable in the cylinder which is gradually restricted by a tapered pin extending therethrough to meter fluid between the chambers when the unit is collapsed on impact of a bumper supported thereby to compensate for any offset between the metering pin and orifice provide for energy absorption in a first stage of operation; the end cap provides frangible support for the orifice which releases at a constant and high pressure during high speed impact to provide for absorption of energy in a second stage of operation.

Another feature, object and advantage of this invention is to provide a new and improved telescoping metering pin, variable orifice energy absorber unit having radially fixed orifice means in a radially adjustable cylinder cap and hydraulically interconnecting a pair of variable volume chambers filled with oil and operative to adjust radially to compensate for misalignment between the pin and the orifice means and in response to buildup of a predetermined pressure in the unit to control oil flow between the chambers to dissipate impact energy and to further break away at a predetermined higher pressure from a support to provide a second and larger diameter radially fixed orifice means for a second level of energy absorption by increasing oil flow between the chambers via the second orifice means in a second stage of operation thereby providing constant and stepped square wave energy absorption performance.

Another feature, object and advantage of this invention is to provide a new and improved metering pin variable orifice energy absorber having telescoping cylinders providing a pair of variable volume hydraulic fluid chambers hydraulically interconnected by a radially fixed orifice within an opening in a cylinder cap adjustably in the end of a cylinder tube which cooperates with the metering pin by radial movement to compensate for misalignment between the pin and fixed orifice and to meter fluid flow between the chambers to dissipate impact energy and having frangible flange connection for high pressure break away to effect formation, a large second orifice interconnecting between the chambers to meter an increased flow of fluid and absorb a higher level of energy in a second stage of operation.

These and other features, objects and advantages of this invention will become more apparent from the following detailed description and drawings in which:

FIG. 1 is a perspective view of a vehicle chassis frame and energy absorbing units mounting a bumper assembly to the frame.

FIG. 1a is a diagram illustrating two-stage energy absorbing operation of one of the units of FIG. 1.

FIG. 2 is an enlarged cross-sectional view taken generally along the plane indicated by lines 2—2 of FIG. 1.

FIG. 3 is an enlarged cross-sectional view of a portion of the energy absorber unit of FIG. 2 illustrating a break away orifice element under overload conditions to provide for high pressure energy dissipation.

FIG. 4 is a cross-sectional view similar to FIG. 2 but showing an alternative radially fixed orifice element prior to break away.

FIG. 5 is a cross-sectional view similar to the views of FIGS. 2 and 4 illustrating another alternative embodiment of the radially fixed orifice element prior to break away from high speed impact loads.

Figure 6:
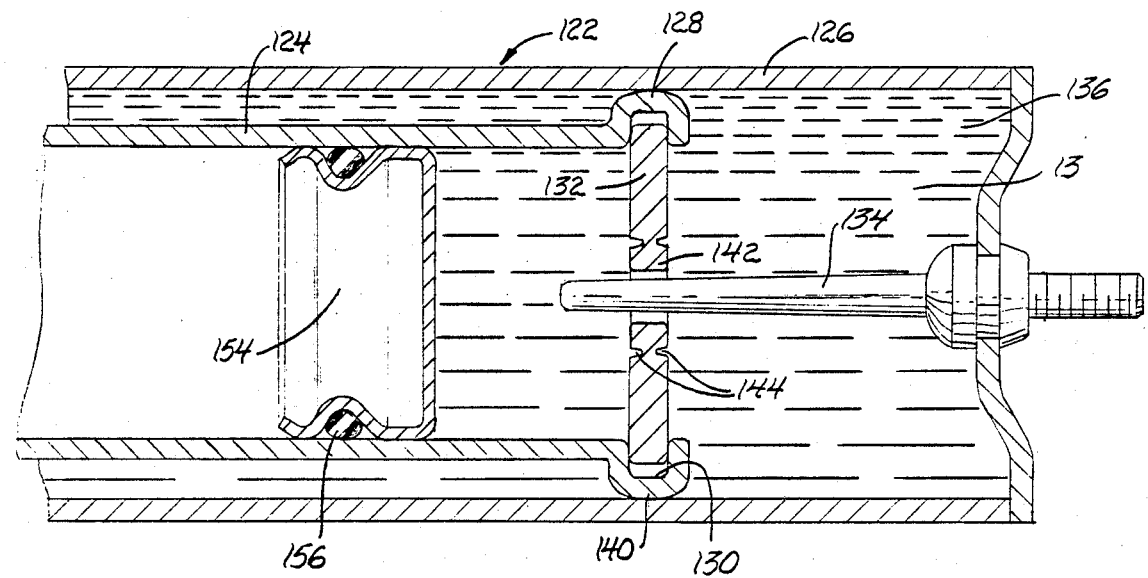
FIG. 6 is a cross-sectional view similar to FIG. 2 illustrating a fixed orifice in a radially adjustable cap of the cylinder tube.

Referring now in particular to FIG. 1 of the drawings, there is a vehicle chassis frame 10 comprising a pair of laterally spaced side rails 12 having forwardly extending horn portion 14 interconnected by a front cross member 16. Bolted to each horn portion 14 are front and rear L-shaped brackets 18 and 20 that are longitudinally spaced from each other which connect identical left and right energy absorbing units 22 to the chassis frame 10. Each energy absorber unit 22 extends through a circular opening in its associated front or outermost bracket 18 and has an outer cylinder 24 welded at 26 to a collar 28. The collar 28 is in turn bolted or otherwise rigidly secured to the front bracket 18. The outer cylinder 24 is closed at one end by an end cap 30 welded or otherwise secured thereto. A threaded stud 32 rigidly fixed to cap 30 and projecting axially therefrom extends through an opening 34 in bracket 20. Nut 36 threaded onto stud 32 rigidly secures the end cap 30 and thus the outer cylinder 24 to the bracket 20.

In addition to the outer cylinder 24, each energy absorber unit 22 comprises an inner cylinder 38 that is mounted for limited telescoping movement within cylinder 24 and which projects forwardly therefrom. The forward end of the inner cylinder 38 is closed by a base plate 40 welded thereto which is adapted to be secured to a bumper assembly 41 by suitable connector means 42. Secured to the inner or rearward end of the inner cylinder 38 is a cylinder cap 44 that separates the interior of the cylinders into intermediate and rear fluid chambers 46 and 48 each of which is filled with a suitable hydraulic fluid such as oil. A thin wall cylindrical cap sleeve 50 is mounted over the cylinder cap 44 to slidably fit the inner diameter of the outer cylinder 24. There is, however, sufficient clearance between the cap sleeve 50 and the inner wall of cylinder 24 allowing the direct communication of chamber 48 with an inner annular space 51 formed between the inner and outer cylinders. The forward end of this inner space is sealed by a resilient cylindrical sleeve 52 disposed between cylinders 24 and 38 and carried by a stop sleeve 53. Stop sleeve 53 is a cylindrical member closely fitting and secured to cylinder 38.

Mounted in the inner cylinder 38 is a floating sheet metal piston 54 fitted with an O-ring 56 that separates the intermediate chamber 46 from a front chamber 58 formed between the floating piston and base plate 40. A quantity of gas is compressed in chamber 58 which is injected through an opening 60 formed in the base plate and is subsequently trapped in chamber 58 by a ball 62 welded in opening 60. The force of gas compressed within chamber 58 acts on the oil in the unit 22 to urge the cylinders 38 and 24 to the normally extended position shown in FIGS. 1 and 2. The stop sleeve 53 is rigidly secured to cylinder 38 and has a tapered head 63 that contacts the inwardly crimped end 65 of cylinder 24 to limit the outward movement of cylinder 38 relative to cylinder 24. The stop sleeve 53 extends rearwardly to support the resilient sealing sleeve 52. This sleeve in addition to providing for fluid sealing also functions as a rebound control device when the unit moves from a telescoped or retracted position toward a fully extended position.

As shown in FIGS. 2 and 3, cap 44 is a thin wall member formed with a centralized orifice element 68 with an annular central opening 69 that has a main cylindrical body 70, the periphery of which is defined by annular groove 72 formed by coining. This coining is concentric with annular opening 69 and provides a built-in weak periphery which allows the main body 70 to break away from the cap 44 at the annular groove 72 under certain high load pressure conditions.

An elongated tapered metering pin 76 fixed to end cap 30 extends axially in the energy absorbing unit 22 and is axially aligned with and projects through the central annular opening 69 of the orifice element 68. The metering pin and orifice element are concentric and cooperate to provide a progressively decreasing orifice area for metering fluid through the opening 69 and all around the metering pin between chambers 48 and 46 as the unit 22 is stroked by an impact load up to a predetermined maximum load.

With this construction during low speed impacts, a substantially constant pressure is maintained in the chamber 48 as it contracts and as the fluid is metered all around the metering pin through the annular diminishing orifice area into the intermediate chamber 46 which expands. This provides a square wave energy absorption curve in the first stage of operation. When the unit strokes under these conditions, the floating piston 54 moves forwardly to further compress the gas in chamber 58 which provides a spring force to subsequently extend the energy absorbing unit to the fully extended position illustrated in FIG. 1 after removal of the compact load.

The displacement of the fluid between the chambers on impact dissipates the impact energy as more fully described in U.S. Pat. No. 3,700,273, issued Oct. 24, 1972 to George W. Jackson et al assigned to the assignee of this invention. When the impact load is removed, the compressed gas within the gas chamber 58 acts as a spring and exerts a spring force on the oil in the intermediate chamber 46 and forces it into the rear chamber 48. Thus, the intermediate chamber contracts while the rear chamber 48 expands during extension or rebound of the energy absorbing unit 22 to its original position.

On high speed impact of the bumper assembly 41, such as a 25-mile per hour impact, a high pressure buildup, 6000 psi for example, will occur in chamber 48 as the unit telescopes and as fluid is uniformly metered around the metering pin through the progressively restrictive opening or aperture 69 of orifice element 68 into chamber 46. The main body 70 of the orifice element shears away at its periphery 72 from cap 44 when the force of oil pressure exerted on the main body exceeds a predetermined force such as might occur during the above-described high speed impact situation. Under such circumstances, the aperture or opening interconnecting chambers 48 and 46 is accordingly increased to equal the diameter of the body of the orifice element 68. This increased opening 79, substantially concentric with the pin, is illustrated in FIG. 3 to increase the hydraulic flow between chambers 46 and 48. With this increased oil flow from rear chamber 48 into intermediate chamber 46, the buildup of pressure in chamber 48 is effectively reduced to a level so that the integrity of the cylinder 24 and of the energy absorbing unit is maintained while energy is absorbed in a second stage of operation. This is the step in the square wave pressure and force or energy absorption curves such as illustrated in FIG. 1a. Accordingly, while the aperture 79 in the cap 44 is open in such high pressure situations, there is still restricted flow concentrically around the metering rod and the inner wall of the cap which forms increased opening 79. In any event, pressure is effectively relieved while impact energy is dissipated through the enlarged restriction between the metering rod and the aperture in the cap in the second stage of operation. With this radially fixed blow out orifice construction as well as those described below, there is even distribution of impact forces providing better control as compared to floating orifice design which are moved to an off center position. Also, this design is more economical to produce as compared to floating orifice designs. After removal of the impact load, the compressed gas in chamber 58 acting through piston 54 forces hydraulic fluid from the chamber 46 back into chamber 48 through the aperture 79 to thereby move the energy absorbing unit back to its extended position.

The embodiments of FIGS. 4 and 5 are similar to the embodiment of FIGS. 2 and 3 and the reference numerals applied to the FIGS. 4 and 5 embodiments identify the same components as those of FIGS. 2 and 3.

In the FIG. 4 embodiment, an orifice element 88 having a cylindrical main body 90 is press-fitted into cap opening or orifice 92 of cylinder cap 44'. This orifice element 88 has a breakaway annular flange 94 which contacts the inner face of the cylinder cap. On high impact loads, the main body breaks away from the flange 94 so that the annular cap orifice 92 provides the increased flow from chamber 48. The metering pin and opening 69' in the orifice are concentric so that there is no orifice floating and the orifice breaks at constant pressure forces. Operation of the energy absorber of FIG. 4 is substantially the same as in the FIG. 3 embodiment. In normal operation, inner cylinder 38 moves to a retracted position on impact and fluid is metered through the orifice opening from chamber 48 to chamber 46 to effect energy absorption. On rebound, the gas spring moves the energy absorber to the extended position as previously explained. On high speed impact, the main body 90 shears away from the flange 94 to leave cap orifice 92 as the opening. Accordingly, a predetermined high pressure buildup in chamber 48 opens the aperture in the cap for increased fluid flow between the chambers all around the metering pin, as the pin strokes through and progressively restricts cap opening 92. This reduces pressure buildup in the unit and effectively prevents rupture of the unit from high internal pressures as the unit dissipates impact energy in a second and higher level of operation to provide the step in the square wave energy absorption curve such as illustrated in FIG. 1a.

FIG. 5 illustrates another embodiment of this invention in which the central opening or aperture 92 of the cylinder cap 44' receives a metallic orifice element 96 with annular and radially extending flange 98. This flange is brazed or welded to face of cap 44 as indicated at 100. This retains the orifice element in the cylinder cap 44' so that press-fitting is not needed. The metering pin 76 is concentric with and extends through the annular opening 69" formed between the rod and the orifice element.

In normal operation, the orifice element functions as in the previous embodiments and cooperates with metering rod 76 to concentrically meter fluid between chambers 46 and 48 on the energy absorbing and rebound stroke. The gas spring previously described provides the motive force for moving the unit to the return position after impact force is removed. In a severe impact, the body of orifice 96 shears away from the flange 98 so that the central aperture 92 forms the opening for the metering rod and there is increased flow from chamber 48 to 46 through aperture 92.

The FIG. 6 embodiment of this invention is similar to the other embodiments but effectively compensates for any misalignment between the metering pin and the orifice formed in the cylinder cap. More specifically, the energy absorber unit 122 is basically like the unit of FIG. 1 and incorporates an inner cylinder tube 124 which, in impact load to the bumper, telescopes into an outer cylinder tube 126. The inner cylinder tube has an enlarged annular head portion 128 which forms an annular groove 130 that accommodates an annular disk-like cap 132 that has an outer diameter smaller than the inner diameter of groove 130 to provide for movement of the cap in any radial direction relative to the cylinder tube in accordance with peripheral contact by the tapered metering pin 134 when the energy absorber unit 122 is stroked.

As in the other embodiments, a large impact load can increase the pressure of the fluid 136 in the inner chamber 138 as it is metered through progressively constricting orifice opening 140 in cap 132. This pressure buildup can exert a force of such magnitude on the orifice element 142 by annular grooves 144 on opposite faces of the cap that it blows out as in the FIG. 3 embodiment to increase the flow area so that internal pressure is relative and the unit is still effective to dissipate energy at a higher level. Importantly, if the pin 134 is off center with respect to the orifice, it will shift radially and still give consistent performance without shifting of any special orifice with annular flange construction as in the prior art.

While this invention has been described in connection with specific embodiments thereof, it will be appreciated that various modifications of this invention can be made in light of the description and drawings and without departing from the disclosure or the scope of the following claims.

The embodiments of the invention in which an exclusive property or privilege is claimed are defined as follows:

1. A variable orifice impact energy absorbing unit for a vehicle comprising first and second hydraulic cylinders telescopically mounted with respect to each other for stroking movement between extended and retracted positions, said cylinders providing a pair of volume chambers filled with fluid, spring means associated with said cylinders for moving cylinders to an extended position, an orifice element operatively mounted in a cap portion of one of said cylinders, retention means securing aid orifice element in said cap portion so that said orifice element is prevented from radial movement with respect thereto during energy absorbing operation of said unit, said orifice element having an internal annular opening to define a radially fixed and centralized fluid flow passage hydraulically interconnecting said chambers, a tapered metering pin substantially concentric with and extending through said fluid flow passage of said fixed orifice element and cooperating directly with said passage when stroking therethrough to gradually reduce the effective flow area of said passage as the cylinders move toward a retracted position in a first stage of energy absorbing operation, said orifice element having a main body, and said retention means comprising frangible means formed by an annular groove directly in said wall of the end around said opening releasably securing said main body to said cap portion so that a predetermined fluid pressure buildup in one of said chambers will exert a force sufficient to displace said main body from said cap to thereby create a large diameter fluid flow opening in said cap allowing pressure fluid to flow from said one of said chambers to the other of said chambers passing said metering pin at an increased rate so that said unit will absorb energy in a second stage of energy absorbing operation.

2. A variable orifice impact energy absorbing unit mounting a bumper assembly to a support on an automotive vehicle comprising first and second cylinders mounted for telescopic movement between extended and retracted positions, said first and second cylinders having cooperating stop means to establish the extended position of said cylinders, said first cylinder disposed in said second cylinder to provide variable volume first and second fluid chambers in said energy absorbing unit, a centralized opening extending through said cap means, a hydraulic fluid in said first and second chambers, fluid flow control means for controlling the flow of fluid from said first chamber into said second chamber in response to the telescopic movement of said cylinders to said retracted position, said fluid flow control means comprising orifice element means radially fixed within said centralized opening in said cap means and having integral and annular wall means to define a radially fixed fluid flow opening hydraulically interconnecting said first and second chambers, a tapered metering pin fixed to one of said cylinders, extending through said fluid flow opening and cooperating directly therewith to provide a fluid flow control passage for metering the flow of fluid between said chambers as said cylinders are moved toward said retracted position to dissipate energy of impact loads up to a predetermined magnitude and frangible means comprised of an annular groove formed directly in wall means around said orifice means in said centralized opening against any radial movement therein as said metering pin linearly moves therethrough and releasably securing said orifice means from said centralized opening so that a fluid force of a predetermined magnitude breaks and generally linearly displaces said orifice means from said opening thereby allowing fluid flow through said opening at an increased rate to reduce pressure buildup in said first chamber so that said unit manages energy of increased impact loads without rupture.

3. A variable orifice impact energy absorbing unit mounting a bumper assembly to a support on an automotive vehicle comprising first and second cylinders mounted for telescopic movement between extended and retracted positions, said first and second cylinders having cooperating stop means to establish the extended position of said cylinders, said first cylinder having retainer means at one end thereof, cap means forming an end of said first cylinder and mounted for radial adjustment in said retainer means slidably disposed in said second cylinder to provide variable volume first and second fluid chambers in said energy absorbing unit, a centralized opening extending through said cap means, a hydraulic fluid in said first and second chambers, fluid flow control means for controlling the flow of fluid from said first chamber into said second chamber in response to the telescopic movement of said cylinders to said retracted position, said fluid flow control means comprising orifice means radially fixed within said centralized opening in said cap means and a cooperating tapered metering pin extending through said orifice means and cooperating directly therewith to provide a fluid flow control passage directly therebetween and for directly contacting and radially shifting said cap means while metering the flow of fluid between said chambers as said cylinders are moved toward said retracted position to dissipate energy of impact loads up to a predetermined magnitude and frangible means formed by groove means directly in said cap means for releasably securing said orifice means in said centralized opening so that a fluid force of a predetermined magnitude breaks and displaces said orifice means from said opening thereby allowing fluid flow past said metering pin and through said opening at an increased rate to reduce pressure buildup in said first chamber so that said unit manages energy of increased impact loads without rupture.

* * * * *